United States Patent
Kung

(10) Patent No.: US 8,748,775 B2
(45) Date of Patent: Jun. 10, 2014

(54) SWITCHABLE COMPOUND LASER WORKING MACHINE

(75) Inventor: Che-Min Kung, New Taipei (TW)

(73) Assignee: Great Computer Corporation, New Taipei (TW)

( * ) Notice: Subject to any disclaimer, the term of this patent is extended or adjusted under 35 U.S.C. 154(b) by 412 days.

(21) Appl. No.: 13/309,106

(22) Filed: Dec. 1, 2011

(65) Prior Publication Data

US 2013/0140282 A1 Jun. 6, 2013

(51) Int. Cl.
*B23K 26/36* (2014.01)
*B44B 3/00* (2006.01)

(52) U.S. Cl.
CPC .. *B23K 26/36* (2013.01); *B44B 3/00* (2013.01)
USPC ............. 219/121.76; 219/121.67; 219/121.68

(58) Field of Classification Search
CPC ............. B23K 26/36; B44B 3/00; B44B 1/00
USPC ............................. 219/121.63–121.72, 121.76
See application file for complete search history.

(56) References Cited

U.S. PATENT DOCUMENTS

| 8,229,589 B2* | 7/2012 | Filip ............................. 700/166 |
| 8,530,788 B2* | 9/2013 | Tanaka et al. ............ 219/121.76 |
| 2008/0083706 A1* | 4/2008 | Kirmeier ......................... 219/72 |
| 2009/0045178 A1* | 2/2009 | Hsu et al. ................. 219/121.68 |

* cited by examiner

*Primary Examiner* — Samuel M Heinrich
(74) *Attorney, Agent, or Firm* — Muncy, Geissler, Olds & Lowe, P.C.

(57) ABSTRACT

A switchable compound laser working machine comprises a machine body, a first output module, a second output module, a switch module, and a control module. The first and second output modules are respectively provided with a laser tube. The switch module has at least one lens. It is able to change the output direction of laser beams by moving the lens. The control module is used for controlling the laser tubes of the first and second output modules to perform output operation respectively and used for moving the lens of the switch module into output pathway of the laser beams from the first or the second output module to alter the output direction of the laser beams.

7 Claims, 5 Drawing Sheets

SWITCHABLE COMPOUND LASER WORKING MACHINE

BACKGROUND OF THE INVENTION

1. Field of Invention

The present invention relates to a switchable compound laser working machine for performing both engraving and cutting operations.

2. Related Art

The basic working principle of conventional laser processing machines is to guide and focus laser beams on surfaces of objects to be engraved. The materials of the objects are gasified due to sudden increase of temperature when the focused laser beams are absorbed by the materials, so that the surfaces of the objects are indented. Thus the objective of engraving or cutting is achieved.

The process of engraving and cutting by utilizing laser is very simple, just like the printing on paper by using a computer and a printer. The only difference there-between is that, for printing, ink is printed on paper; as for laser engraving, laser is projected onto nearly all kinds of materials such as wood, acryl, plastic, metal, stone, etc.

However, currently available laser engraving and cutting machines can be classified into two types, that is, metal tube laser machines and glass tube laser machines. The metal tube laser machines have higher watts and prices and are suitable for engraving operation. The glass tube laser machines have lower watts and prices and are suitable for cutting operation. Therefore, metal tube laser machines are used to perform engraving while the glass tube laser machines are used to perform cutting. Accordingly, users need to use different machines for different purposes of engraving and cutting, which is inconvenient for the users. Besides, there are still other disadvantages, such as that much more space is required to place different machines and that the total cost is increased. In order to solve above problems, laser working machines with two laser tubes are developed. In these machines, a light-converging lens is provided at the cross point of the two laser beams respectively from the two laser tubes. As shown in FIG. 5, two glass tubes "a", "b" and a light-converging lens "c" are illustrated. The lens "c" has one surface capable of reflection and the other surface capable of light transmission. Consequently, the laser beams from the two laser tubes "a", "b" can be output via a common pathway to process objects. However, the light-converging lens is not suitable for all kinds of laser tubes because the lasers from different kinds of laser tubes possess different optical and physical properties and consequently have different transmission and reflection values after being in contact with the coated material on the surfaces of the light-converging lens "c". As a result, it will decrease the output energy of the lasers from the machines. Moreover, the cost of the light-converging lens "c" is higher and may further increase the total cost of the machine. Therefore, the light-converging lens "c" is not suitable for all kinds of laser working machines with two laser tubes "a", "b".

SUMMARY OF THE INVENTION

A primary object of the present invention is to provide a switchable compound laser working machine for performing both engraving and cutting operations.

In order to achieve the above-mentioned object, the present invention provides a switchable compound laser working machine comprising a machine body and the machine body is provided thereon with a first output module, a second output module, a switch module, and a control module. The first and second output modules are respectively provided with a laser tube and the switch module has at least one lens. It is able to change the output direction of laser beams by moving the lens. The control module is used for controlling the laser tubes of the first and second output modules to perform output operation and for moving the lens of the switch module into output pathway of the laser beams from the first or the second output module to alter the output direction of the laser beams.

When it is embodied, the first output module is an engraving module and the engraving module comprises an engraving laser tube for output of engraving operation; and the second output module is a cutting module and the cutting module comprises a cutting laser tube for output of cutting operation. Besides, the engraving laser tube of the engraving module for output of engraving operation is a metal laser tube, and the cutting laser tube of the cutting module for output of cutting operation is a glass laser tube. The lasers respectively from the metal laser tube of the engraving module and from the glass laser tube of the cutting module are carbon-dioxide type lasers. Or, the lasers from the metal laser tube and the glass laser tube are of the same wavelength.

When it is embodied, the switchable compound laser working machine further comprises a computer module that is disposed on the machine body and is connected with the control module. The computer module is used for driving the control module to control the first output module, the second output module, and the switch module to perform output operation after receiving at least one command.

The present invention will become more fully understood by reference to the following detailed description thereof when read in conjunction with the attached drawings.

DETAILED DESCRIPTION OF THE INVENTION

Figure 1:
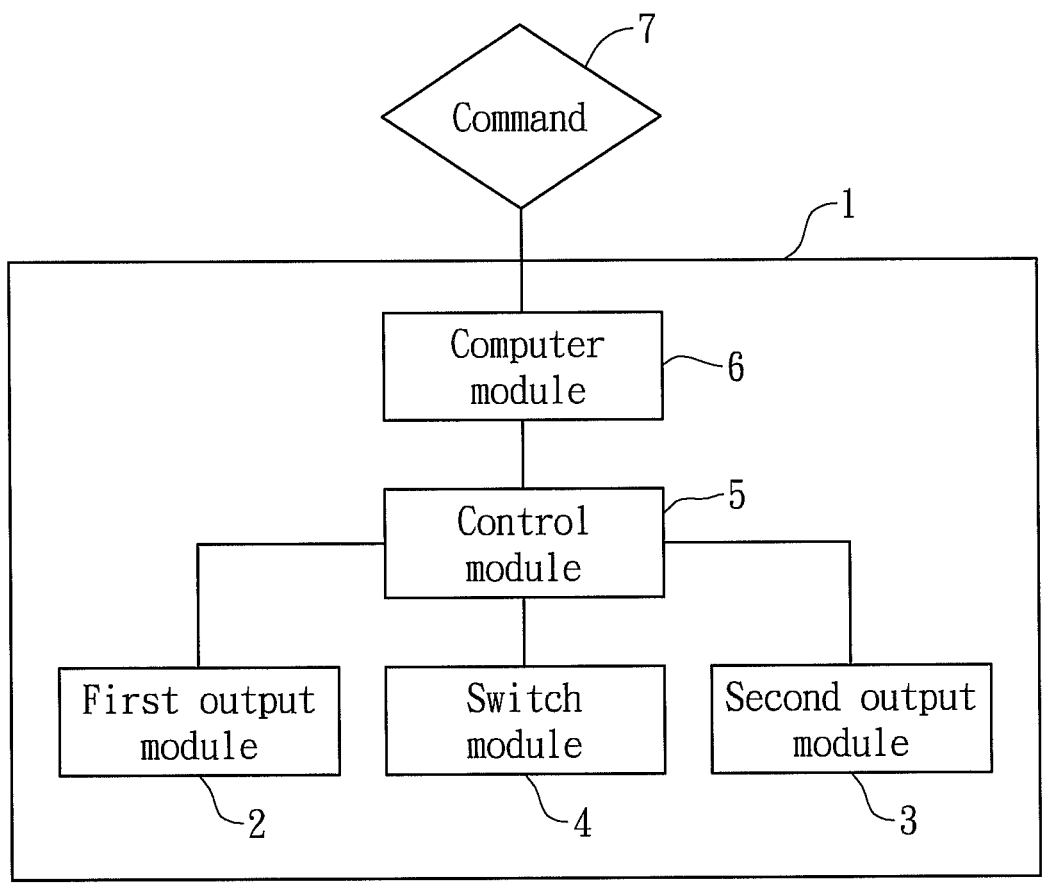
FIG. 1 shows a framework of a preferred embodiment of a switchable compound laser working machine of the present invention.
Figure 2:
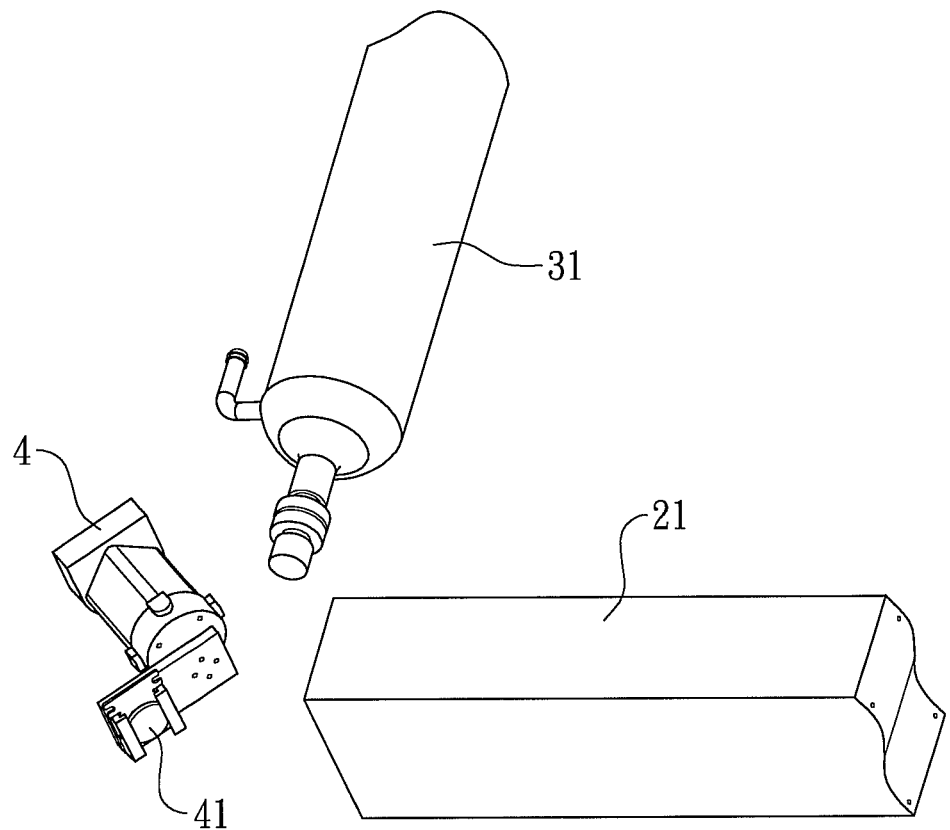
FIG. 2 is a schematic view of the preferred embodiment of the present invention, where the first output module, the second output module, and the switch module are not driven.

Please refer to FIGS. 1-4, where an embodiment of a switchable compound laser working machine according to the present invention is illustrated. It comprises a machine body 1 and the machine body 1 is disposed thereon with a first output module 2, a second output module 3, a switch module 4, and a control module 5.

The first output module 2 is an engraving module that is provided with an engraving laser tube 21. The engraving laser tube 21 is a metal laser tube for output of engraving operation. The second output module 3 is a cutting module that is provided with a cutting laser tube 31. The cutting laser tube 31 is a glass laser tube for output of cutting operation. Besides, the lasers from the metal laser tube of the first output module 2 and from the glass laser tube of the second output module 3 are all carbon-dioxide type lasers. Moreover, preferably, all the lasers from the metal laser tube and the glass laser tube have the same wavelength.

The switch module 4 is provided with at least one lens 41. It is able to alter the output direction of laser beams by moving the lens 41. The control module 5 is respectively connected with the first output module 2, the second output module 3, and the switch module 4, and is used for controlling the engraving and cutting laser tubes 21, 31 to perform the output of engraving and cutting operations and for moving the lens 41 of the switch module 4 into the output pathway of the laser beams from the first output module 2 or the second output module 3 to alter the output direction of the laser beams.

Figure 3:
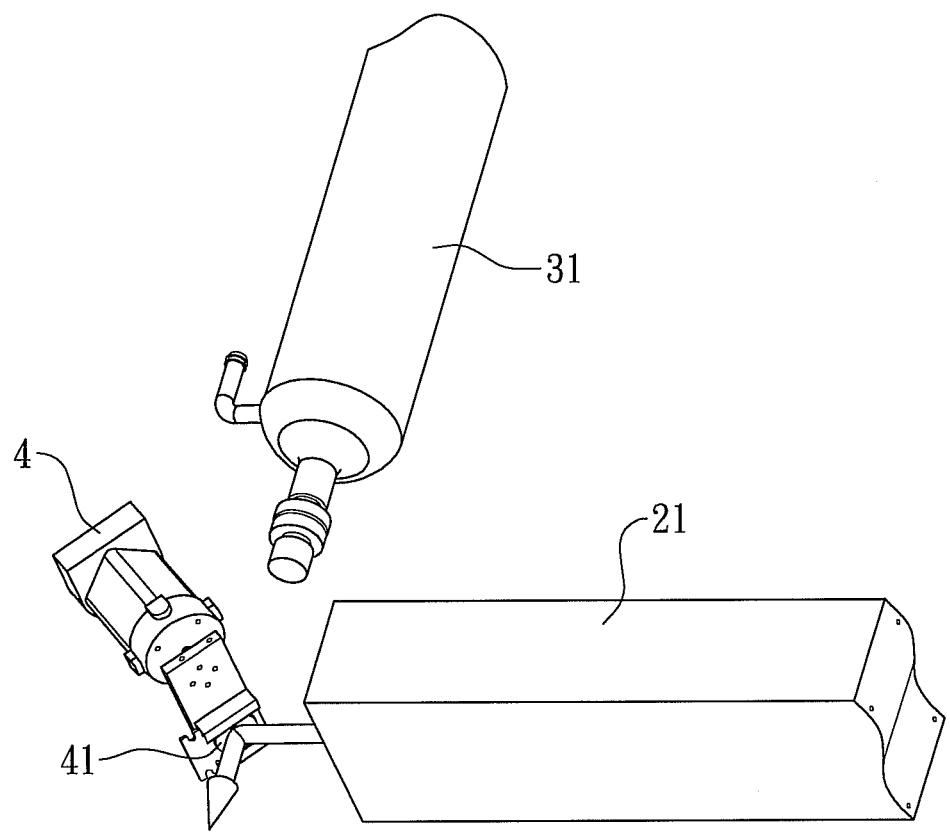
FIG. 3 is another schematic view of the preferred embodiment of the present invention, where the pathway of the laser beams from the first output module is altered by the lens of the switch module.

Therefore, in the preferred embodiment, the pathway of the laser beams from the first output module 2, for example, can be altered as shown in FIG. 3. When the engraving operation is performed, the switch module 4 will move the lens 41 into the pathway of the laser beams from the first output module 2 when receiving an engraving command from the control module 5. After that, the laser tube 21 of the first output module 2 will be driven to emit laser beams when receiving the engraving command from the control module 5. The pathway of the laser beams from the laser tube 21 will be changed via the lens 41. Thereby, laser beams will travel along the predetermined pathway to perform the engraving operation.

Figure 4:
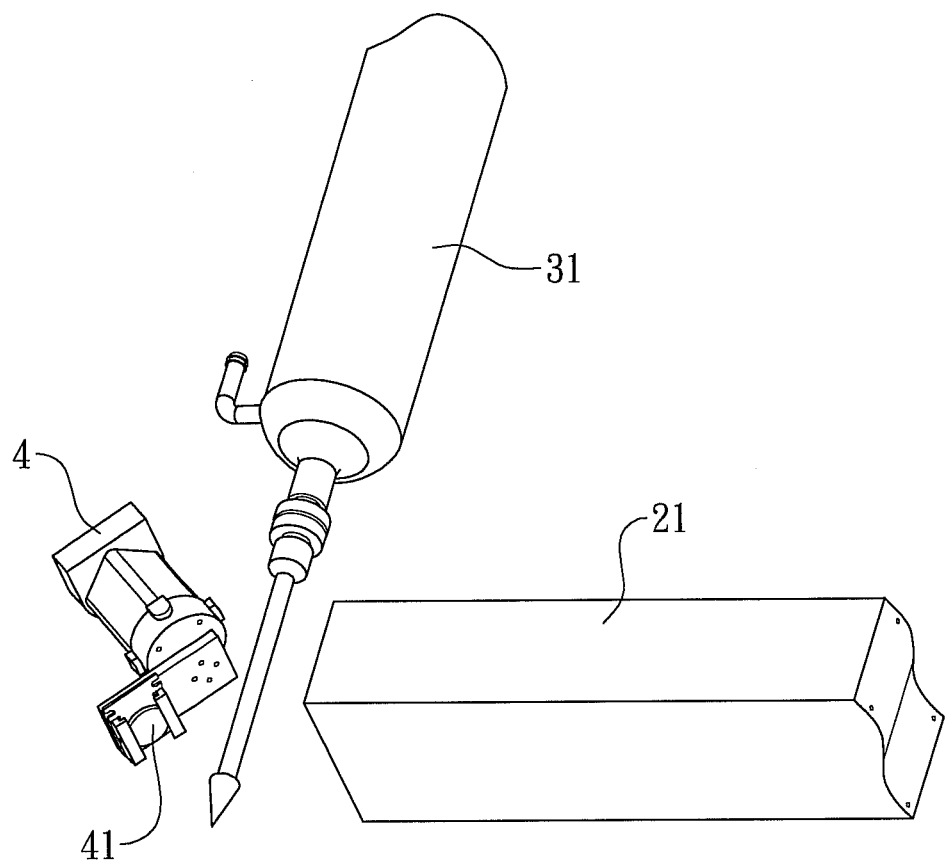
FIG. 4 is still another schematic view of the preferred embodiment of the present invention, where the lens of the switch module is moved away from the pathway of the laser beams.
Figure 5:
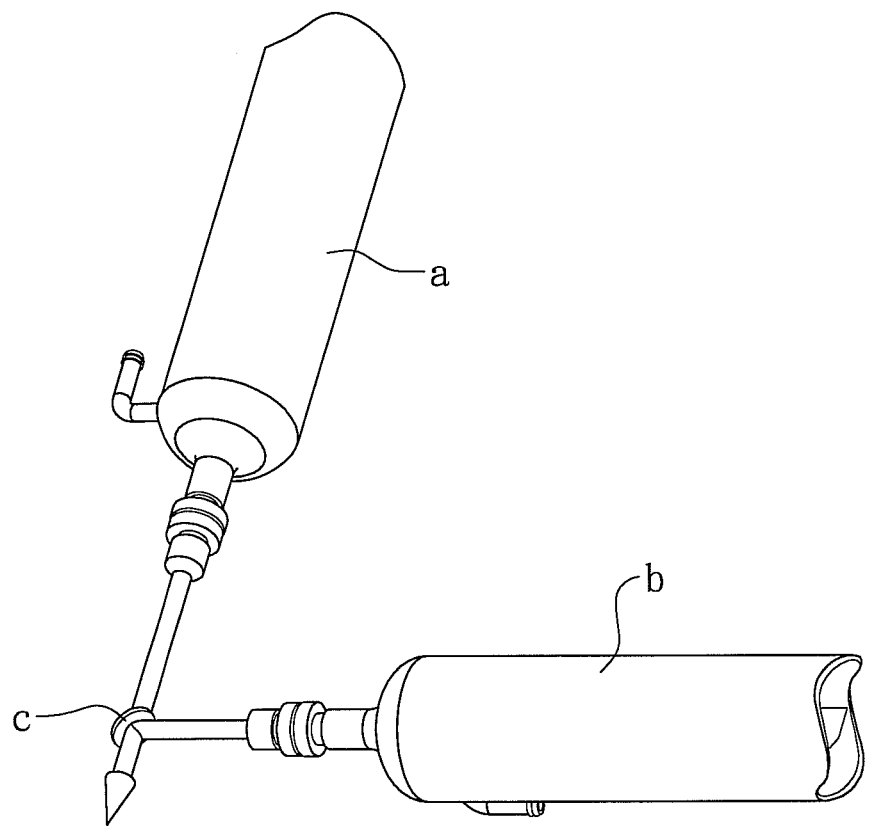
FIG. 5 shows a conventional laser tube with a light-converging lens.

As shown in FIG. 4, after it is switched to the cutting operation, the switch module 4 will move the lens 41 away from the pathway of the laser beams from the second output module 3 when receiving the cutting command from the control module 5. After that, the laser tube 31 of the second output module 3 will be driven to emit laser beams after receiving the engraving commands continually from the control module 5. In this case, the lens 41 does not hinder the lasers from the laser tube 31. Thereby, laser beams will travel along the predetermined pathway to perform the cutting operation.

Furthermore, according to the present invention, a computer module 6 is further provided as shown in FIG. 1 and is connected with the control module 5. The computer module 6 is used to drive the control module 5 to control the first output module 2, the second output module 3, and the switch module 4 to perform output operation when receiving at least one command 7.

Therefore, users can perform engraving or cutting operation on the machine body of the switchable compound laser working machine of the present invention according to their need. When the engraving operation is to be performed, it is required to input the engraving command 7 or parameters to drive the control module 5 via the computer module 6 to control the metal laser tube of the first output module 2 for engraving operation. When the cutting operation is to be performed, it is required to input the cutting command 7 or parameters to drive the control module 5 via the computer module to control the glass laser tube of the second output module 3 for cutting operation. Besides, without a light-converging lens, the engraving and the cutting operations can be performed individually or simultaneously by moving the lens 41 via the switch module 4 to alter the output pathway of the laser beams. In this case, the total cost for the machine body 1 can be reduced. Moreover, less time is required to be taken for the whole process, which renders the whole process more efficient.

Accordingly, as disclosed in the above description and attached drawings, the present invention can provide a switchable compound laser working machine. It is new and can be put into industrial use.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. A switchable compound laser working machine, comprising:
    a machine body;
    a first output module disposed on the machine body, where the first output module includes a laser tube used for output of laser operation;
    a second output module disposed on the machine body, where the second output module includes a laser tube used for output of laser operation;
    a switch module disposed on the machine body, where the switch module includes at least one lens, so that the output direction of laser beams is altered by moving the lens; and
    a control module disposed on the machine body, where the control module is respectively connected with the first output module, the second output module, and the switch module, and is used to control the laser tubes for performing output operation and to move the lens of the switch module into output pathway of the laser beams from the first output module or the second output module for altering the output direction of the laser beams.

2. The switchable compound laser working machine as claimed in claim 1, wherein the first output module is an engraving module and the engraving module comprises an engraving laser tube for output of engraving operation; and the second output module is a cutting module and the cutting module comprises a cutting laser tube for output of cutting operation.

3. The switchable compound laser working machine as claimed in claim 2, wherein the engraving laser tube of the engraving module for output of engraving operation is a metal laser tube, and the cutting laser tube of the cutting module for output of cutting operation is a glass laser tube.

4. The switchable compound laser working machine as claimed in claim 3, wherein the lasers from the metal laser tube and the glass laser tube are of the same wavelength.

5. The switchable compound laser working machine as claimed in claim 3, wherein the lasers respectively from the metal laser tube of the engraving module and from the glass laser tube of the cutting module are carbon-dioxide type lasers.

6. The switchable compound laser working machine as claimed in claim 5, wherein the lasers from the metal laser tube and the glass laser tube are of the same wavelength.

7. The switchable compound laser working machine as claimed in claim 1, further comprising a computer module disposed on the machine body and is connected with the control module, where the computer module is used for driving the control module to control the first output module, the second output module, and the switch module to perform output operation after receiving at least one command.

* * * * *